(12) United States Patent
Sodagar

(10) Patent No.: US 12,494,021 B2
(45) Date of Patent: Dec. 9, 2025

(54) APPARATUS FOR CREATING SHARED VIRTUAL AR CONVERSATIONAL SPACE ON THE NETWORK FOR MULTIPLE PARTICIPANTS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 148 days.

(21) Appl. No.: 18/063,403

(22) Filed: Dec. 8, 2022

(65) Prior Publication Data

US 2023/0252734 A1 Aug. 10, 2023

Related U.S. Application Data

(60) Provisional application No. 63/307,552, filed on Feb. 7, 2022.

(51) Int. Cl.
*G06T 19/00* (2011.01)
*G06T 19/20* (2011.01)

(52) U.S. Cl.
CPC ............ *G06T 19/006* (2013.01); *G06T 19/20* (2013.01); *G06T 2219/2004* (2013.01)

(58) Field of Classification Search
CPC .................. G06T 19/006; G06T 19/20; G06T 2219/2004; G06F 3/011
See application file for complete search history.

(56) References Cited

U.S. PATENT DOCUMENTS

| | | | | |
|---|---|---|---|---|
| 10,109,055 | B2* | 10/2018 | Xu | H04N 13/239 |
| 10,573,037 | B2* | 2/2020 | Kumar | G06F 3/011 |
| 11,157,739 | B1* | 10/2021 | Iskandar | H04W 4/021 |
| 11,159,766 | B2* | 10/2021 | Kies | G06F 1/163 |
| 2015/0213650 | A1* | 7/2015 | Barzuza | H04L 67/131 |
| | | | | 348/14.07 |
| 2019/0130655 | A1* | 5/2019 | Gupta | G06T 19/20 |
| 2019/0253667 | A1 | 8/2019 | Valli | |
| 2019/0310757 | A1* | 10/2019 | Lee | H04N 7/157 |
| 2019/0313059 | A1* | 10/2019 | Agarawala | G06F 3/011 |
| 2019/0340649 | A1* | 11/2019 | Ayush | G06V 10/255 |

(Continued)

OTHER PUBLICATIONS

"3rd Generation Partnership Project; Technical Specification Group SA; Support of 5G Glass-type Augmented Reality / Mixed Reality (AR/MR) devices; (Release 17)", 3GPP TR 26.998 V1.1.2, Feb. 2022, 121 pgs.

(Continued)

*Primary Examiner* — Michael Le
(74) *Attorney, Agent, or Firm* — Sughrue Mion, PLLC

(57) ABSTRACT

There is included a method and apparatus comprising computer code configured to cause a processor or processors to obtain video from a AR devices, determine, based on the video data, orientations of users of the AR devices relative to object in respective physical spaces, generate generating a common scene description based on the orientation, and control, based on the common scene description, at least one of the AR devices to display a user of another of the AR devices such that the user is virtually overlaid on an object in the first physical space in which the one of the AR devise is located.

20 Claims, 14 Drawing Sheets

(56) References Cited

U.S. PATENT DOCUMENTS

| | | | |
|---|---|---|---|
| 2019/0392630 A1 | 12/2019 | Sturm et al. | |
| 2020/0051318 A1* | 2/2020 | Muthler | G06N 5/046 |
| 2020/0099891 A1 | 3/2020 | Valli et al. | |
| 2021/0067840 A1* | 3/2021 | Mate | A63F 13/65 |
| 2021/0084259 A1* | 3/2021 | Kies | G06F 1/1686 |
| 2021/0373741 A1* | 12/2021 | Agarawala | H04L 67/52 |
| 2023/0260240 A1* | 8/2023 | Jayaram | H04N 13/243 |
| 2024/0185545 A1* | 6/2024 | Tahara | G06V 20/20 |

OTHER PUBLICATIONS

International Search Report dated Mar. 22, 2023 in Application No. PCT/US22/52668.
Written Opinion of the International Searching Authority dated Mar. 22, 2023 in Application No. PCT/US22/52668.
Extended European Search Report dated Mar. 13, 2025 in Application No. 22925207.7.

\* cited by examiner

APPARATUS FOR CREATING SHARED VIRTUAL AR CONVERSATIONAL SPACE ON THE NETWORK FOR MULTIPLE PARTICIPANTS

CROSS REFERENCE TO RELATED APPLICATION

The present application claims priority to provisional applications U.S. 63/307,552 filed on Feb. 7, 2022, the contents of which are hereby expressly incorporated by reference, in their entirety, into the present application.

BACKGROUND

1. Field

The present disclosure is directed to providing virtual conversation sessions with augmented reality (AR) devices in which each participant sees all other participants in their local space, but the arrangement of the participants in their local space is the same as others, i.e. people are sitting/standing/etc. in the same configuration as if all they are in a commonplace and with same or similar orientations according to exemplary embodiments.

2. Description of Related Art

Even if AR streaming devices may provide an image of other participants to a conference, those AR devices are unable to synchronize the virtual overlays of the other participants to the various object and depths per each user in different physical spaces or to allow each AR user, in their own respective environments, to view other AR users in a relatively same orientation shared by each of the AR participants.

SUMMARY

To address one or more different technical problems, this disclosure provides technical solutions to reduce network overhead and server computational overheads while delivering an option to apply various operations to the resolved element such that in using these operations some of practicality and technical signaling features thereof may be improved.

There is included a method and apparatus comprising memory configured to store computer program code and a processor or processors configured to access the computer program code and operate as instructed by the computer program code. The computer program code comprises obtaining code configured to cause the at least one processor to obtain video data from a first AR device and from a second AR device, the first AR device being worn by a first user in a first physical space, and the second AR device being worn by a second user in a second physical space separate from the first physical space, determining code configured to cause the at least one processor to determine, based on the video data, a first orientation of the first user relative to any object in the first physical space and a second orientation of a second user relative to any object on the second physical space, generating code configured to cause the at least one processor to generate a common scene description for both the first AR device and the second AR device based on determining the first orientation and the second orientation, and controlling code configured to cause the at least one processor to control, based on the common scene description, the first AR device to display to the first user a representation of the second user that is overlaid on an object in a virtual scene comprising the first physical space in which the first user is located. As described herein, the physical spaces may be ones of rooms or may be other spaces besides rooms, such as an outdoors space or the like, and the objects may be one or more furniture or the like according to exemplary embodiments.

According to exemplary embodiments, generating the common scene description is implemented by the first AR device.

According to exemplary embodiments, generating the common scene description is implemented by a network device separate from each of the first AR device and the second AR device.

According to exemplary embodiments, controlling the first AR device to display the second user virtually overlaid on the object in the first physical space is further based on checking whether to virtually overlay the second user on at least one other piece of object in the first physical space.

According to exemplary embodiments, the computer program code further comprises further obtaining code configured to cause the at least one processor to obtain third video data from a third AR device, the third AR device being worn by a third user in a third physical space, further determining code configured to cause the at least one processor to determine, based on the third video data, a third orientation of the third user relative to any object in the third physical space, and further generating code configured to cause the at least one processor to generate the common scene description further based on determining the third orientation.

According to exemplary embodiments, computer program code further comprises further controlling code configured to cause the at least one processor to control, based on the common scene description, the first AR device to display, to the first user, the third user such that the third user is virtually overlaid on a second object in the first physical space.

According to exemplary embodiments, an orientation of the second user virtually overlaid on the object and the third user overlaid on the second object is determined based on determining that the first user is to be virtually overlaid on other object in a corresponding orientation in each of the second physical space and the third physical space to relative perspectives of each of the second user and the third user.

According to exemplary embodiments, at least one of the first physical space, the second physical space, and the third physical space is a physical space in a home, and wherein others of the first physical space, the second physical space, and the third physical space are in any of an office and a public space.

According to exemplary embodiments, at least one of the first object and the second object is an office chair, and wherein the third object is one of a love seat, a couch, and a coffee table.

According to exemplary embodiments, the common scene description is provided to each of the first AR device, the second AR device, and the third AR device

BRIEF DESCRIPTION OF THE DRAWINGS

Further features, nature, and various advantages of the disclosed subject matter will be more apparent from the following detailed description and the accompanying drawings in which.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
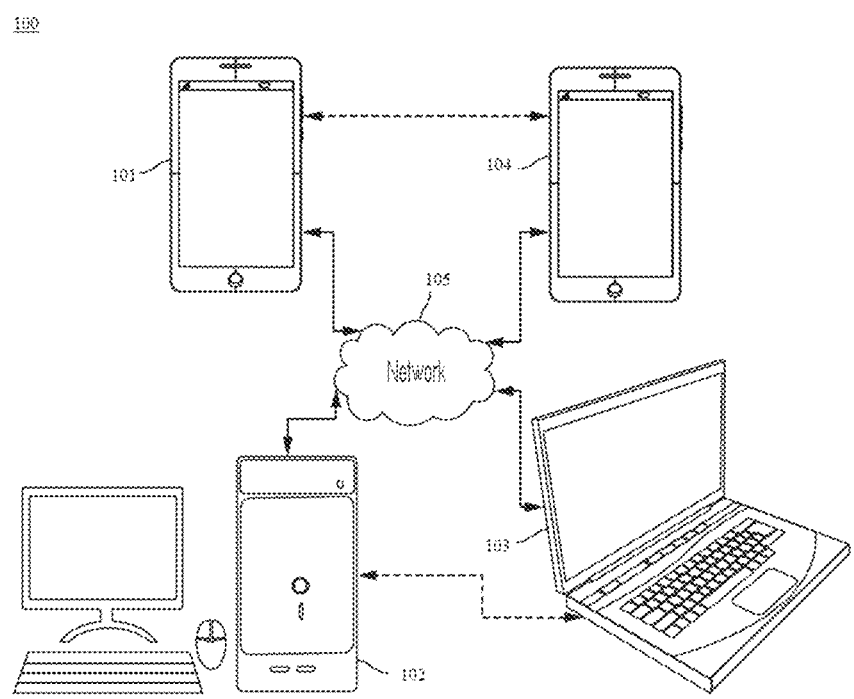
FIG. 1 is a simplified schematic illustration in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
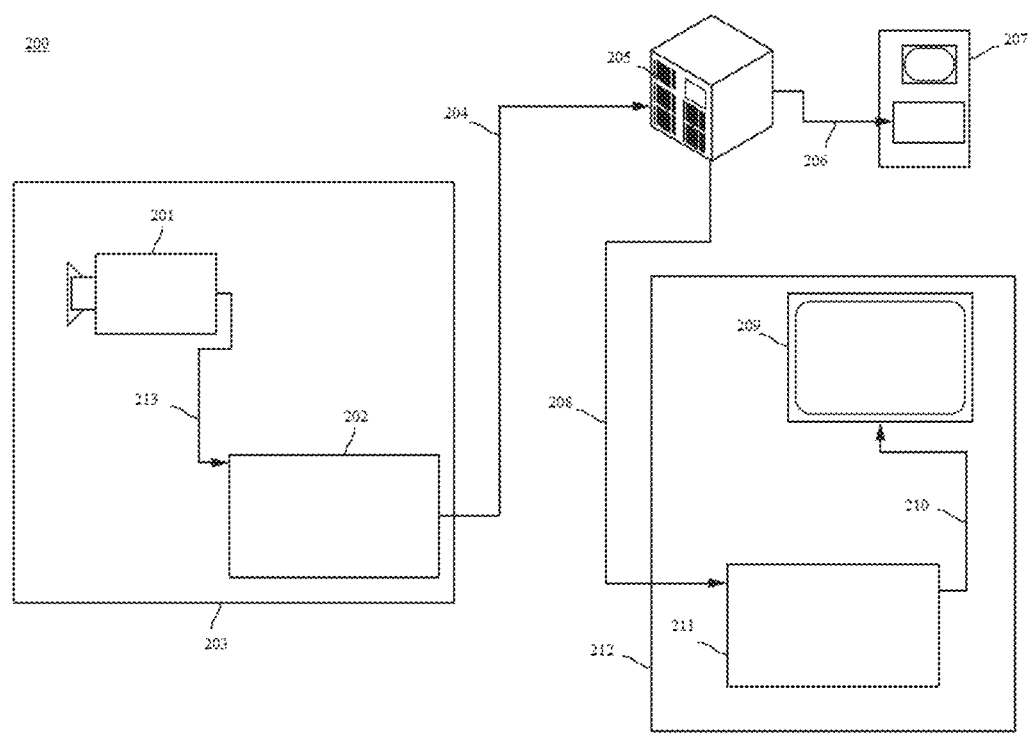
FIG. 2 is a simplified schematic illustration in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
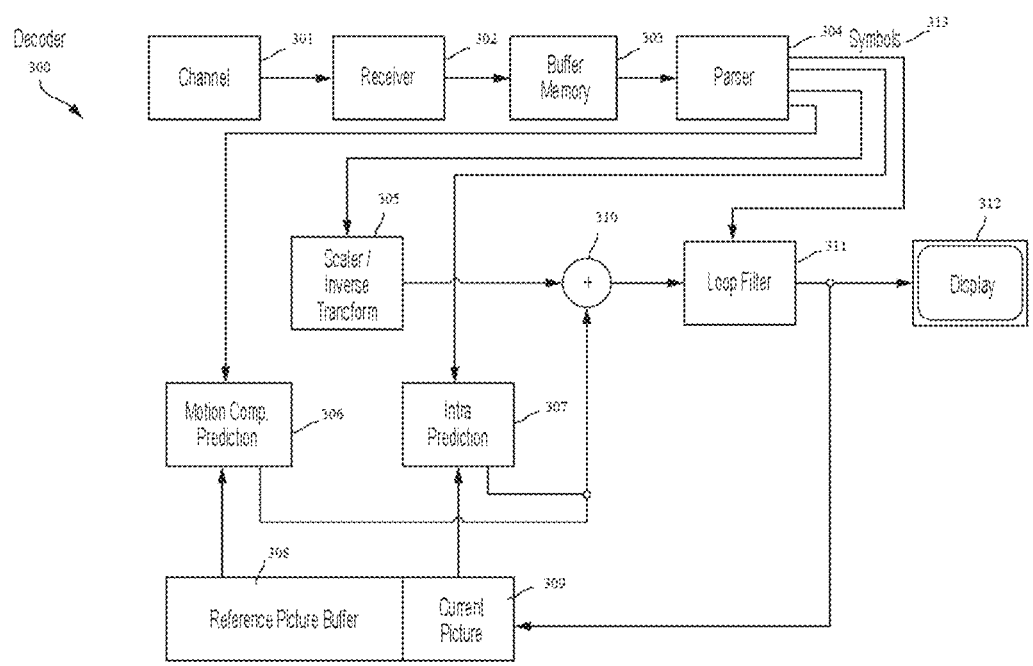
FIG. 3 is a simplified block diagram regarding decoders in accordance with embodiments.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
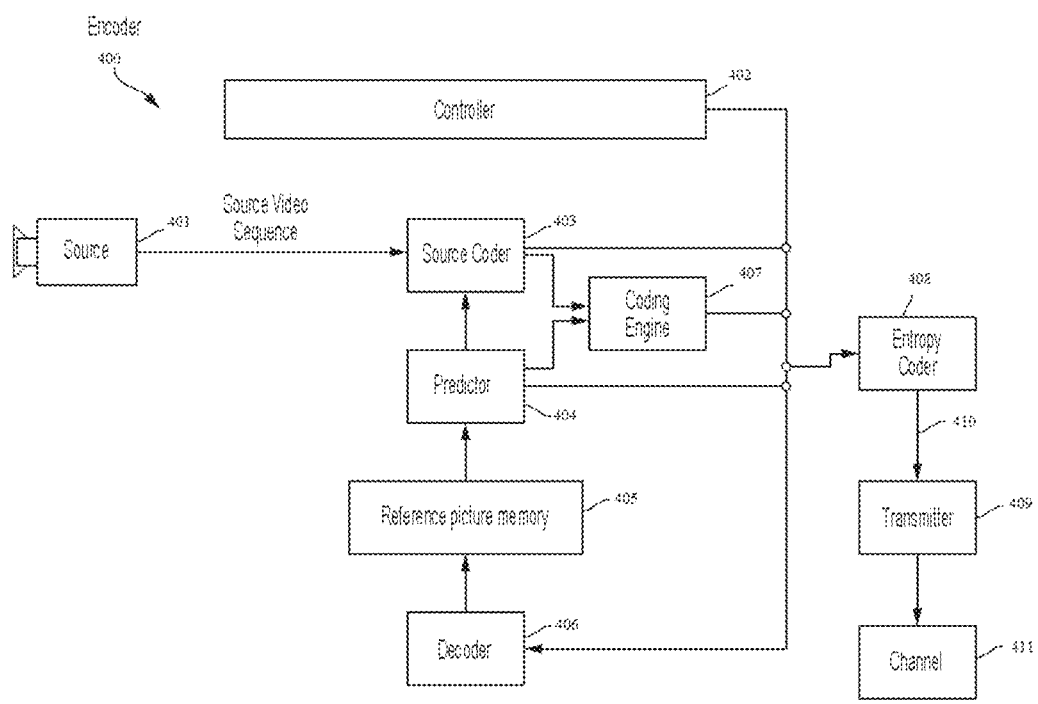
FIG. 4 is a simplified block diagram regarding encoders in accordance with embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence (s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
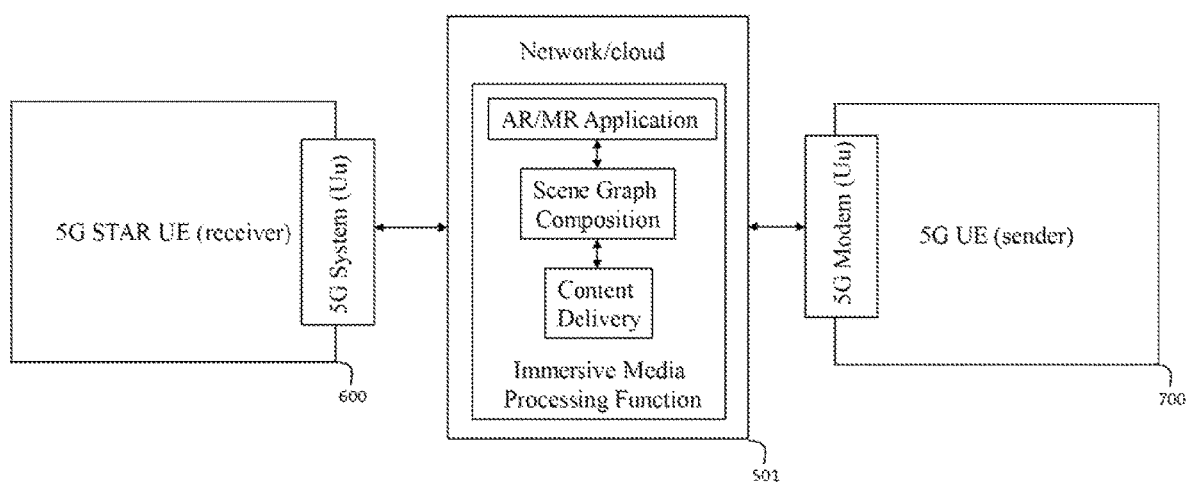
FIG. 5 is a simplified block diagram in accordance with embodiments.
Figure 6:
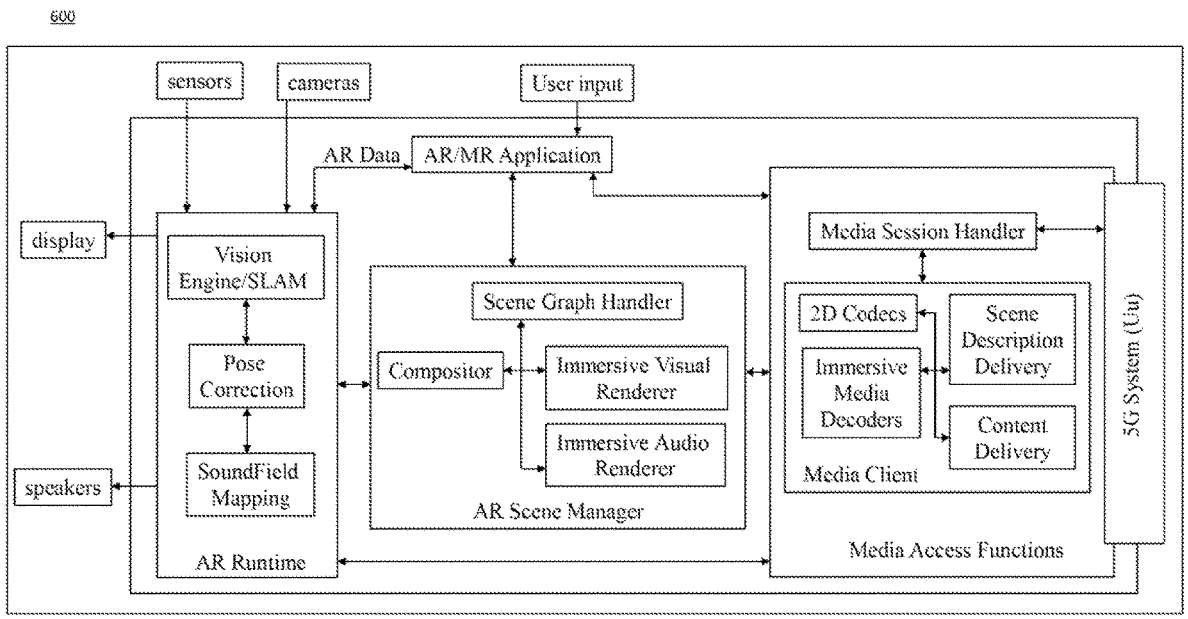
FIG. 6 is a simplified block diagram in accordance with embodiments.
Figure 7:
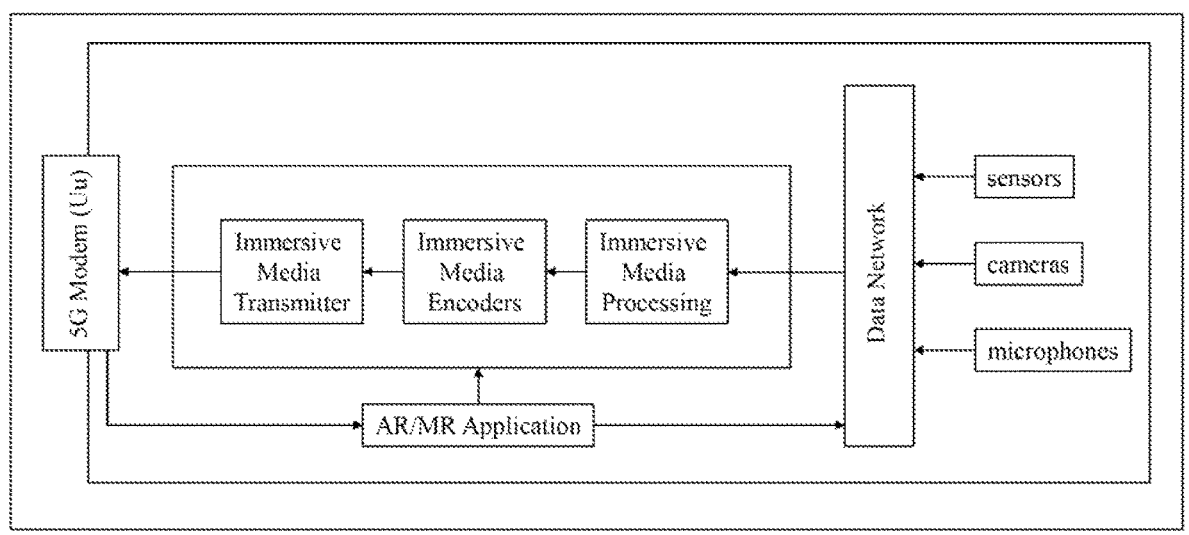
FIG. 7 is a simplified block diagram in accordance with embodiments.

FIG. 5 is an example 500 of an end-to-end architecture for a stand-alone AR (STAR) device according to exemplary embodiments showing a 5G STAR user equipment (UE) receiver 600, a network/cloud 501, and a 5G UE (sender) 700. FIG. 6 is a further detailed example 600 of one or more configurations for the STAR UE receiver 600 according to exemplary embodiments, and FIG. 7 is a further detailed example 700 of one or more configurations for the 5G UE sender 700 according to exemplary embodiments. 3GPP TR 26.998 defines the support for glass-type augmented reality/mixed reality (AR/MR) devices in 5G networks. And according to exemplary embodiments herein, at least two device classes are considered: 1) devices that are fully capable of decoding and playing complex AR/MR content (Stand-alone AR or STAR), and 2) devices that have smaller computational resources and/or smaller physical size (and therefore battery), and are only capable of running such application if the large portion of computation is performed on 5G edge server, network or cloud rather than on the device (Edge dependent AR or EDGAR).

And according to exemplary embodiments, as described below, there may be experienced a shared conversational use case in which all participants of a shared AR conversational experience have AR devices, each participant sees other participants in an AR scene, where the participants are overlays in the local physical scene, the arrangement of the participants in the scene is consistent in all receiving devices, e.g., the people in each local space have the same position/seating arrangement relative to each other, and such virtual space creates the sense of being in the same space but the physical space varies from participant to participant since the physical space is the actual physical space or space each person is physically located.

For example according to the exemplary embodiments shown with respect to FIGS. 5-7, an immersive media processing function on the network/cloud 501 receives the uplink streams from various devices and composes a scene description defining the arrangement of individual participants in a single virtual conference physical space. The scene description as well as the encoded media streams are delivered to each receiving participant. A receiving participant's 5G STAR UE 600 receives, decodes, and processes the 3D video and audio streams, and renders them using the received scene description and the information received from its AR Runtime, creating an AR scene of the virtual conference physical space with all other participants. While the virtual physical space for the participants is based on their own physical space, the seating/position arrangement of all other participants in the physical space is consistent with every other participant's virtual physical space in this session.

Figure 8:
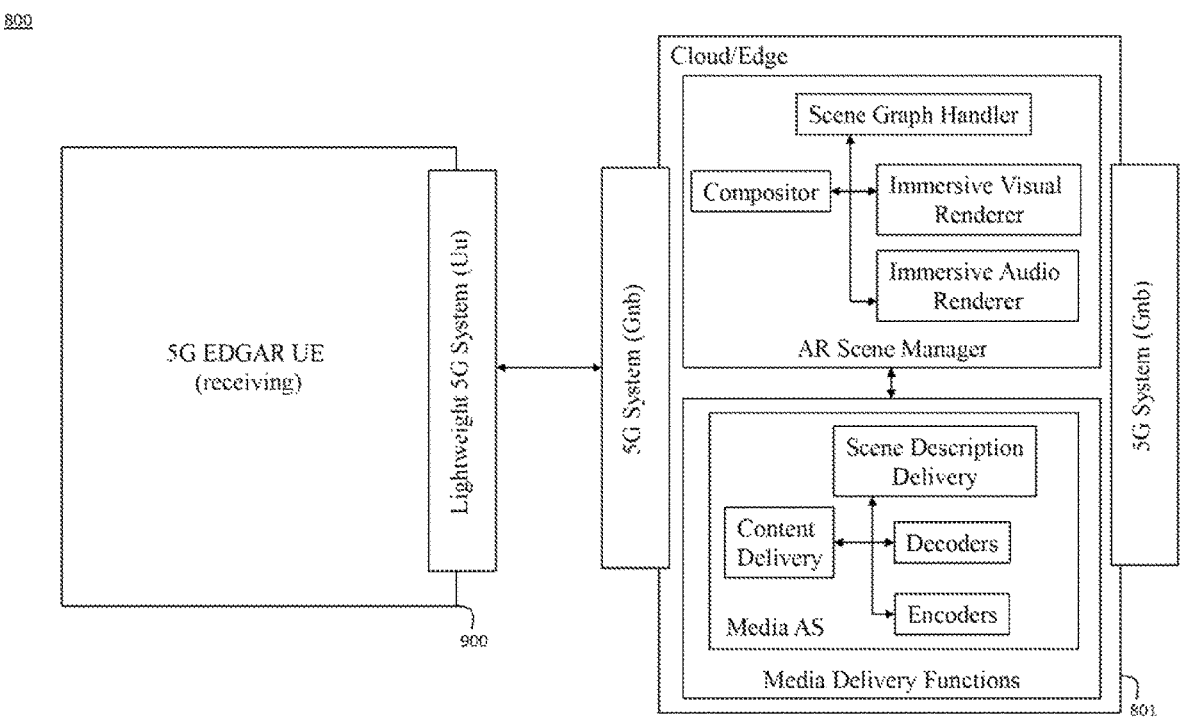
FIG. 8 is a simplified block diagram in accordance with embodiments.
Figure 9:
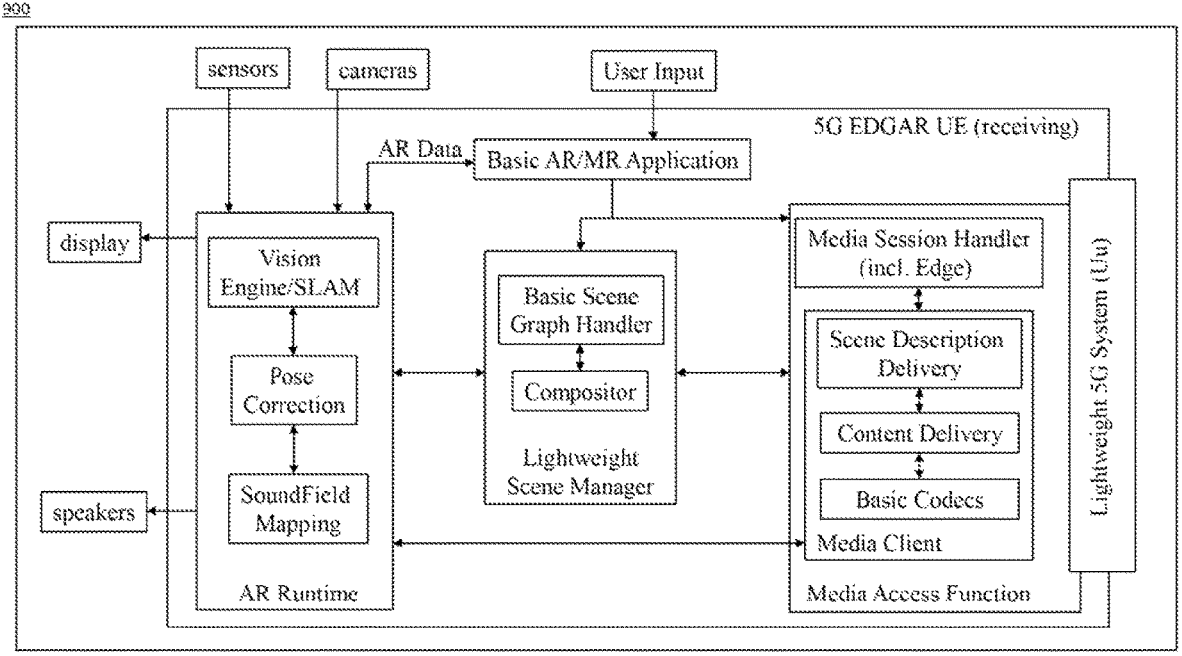
FIG. 9 is a simplified block diagram in accordance with embodiments.

According to exemplary embodiments, see also FIG. 8 showing an example 800 regarding an EDGAR device architecture, where the device, such as the 5G EDGAR UE 900, itself is not capable of heavy processing. Therefore, the scene parsing and media parsing for the received content is performed in the cloud/edge 801, and then a simplified AR scene with a small number of media components is delivered to the device for processing and rendering. FIG. 9 shows a more detailed example of the 5G EDGAR UE 900 according to exemplary embodiments.

However, even with such capabilities as with respect to the exemplary embodiments of FIGS. 5-9, there may be one or more technical problems as to building a common virtual space scene description, if at all, in the immersive media function. And as described below, such embodiments are technologically improved in the context of immersive media processing function to generate a scene description that would be provided to all participants such that all participants may experience the same relative arrangement of the participants in the local AR scene.

Figure 10:
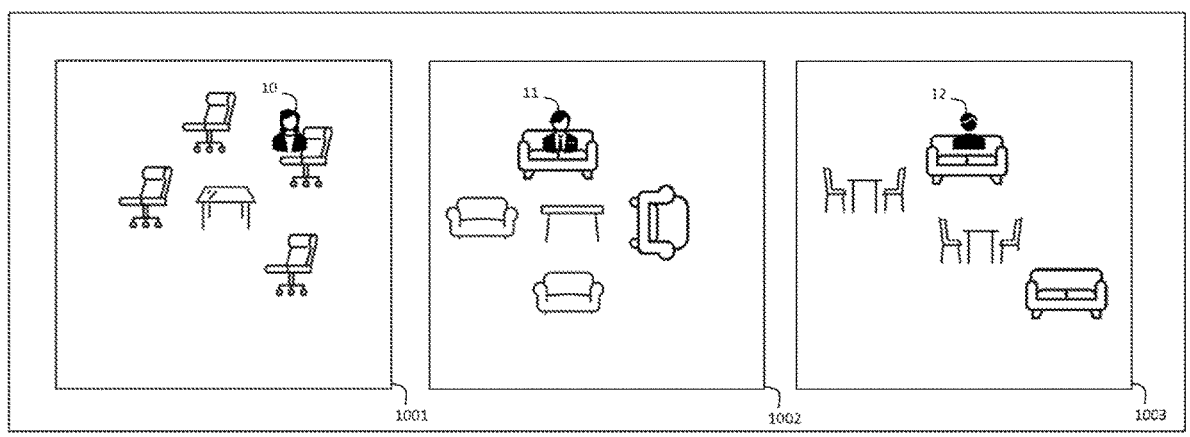
FIG. 10 is a simplified diagram in accordance with embodiments.
Figure 11:
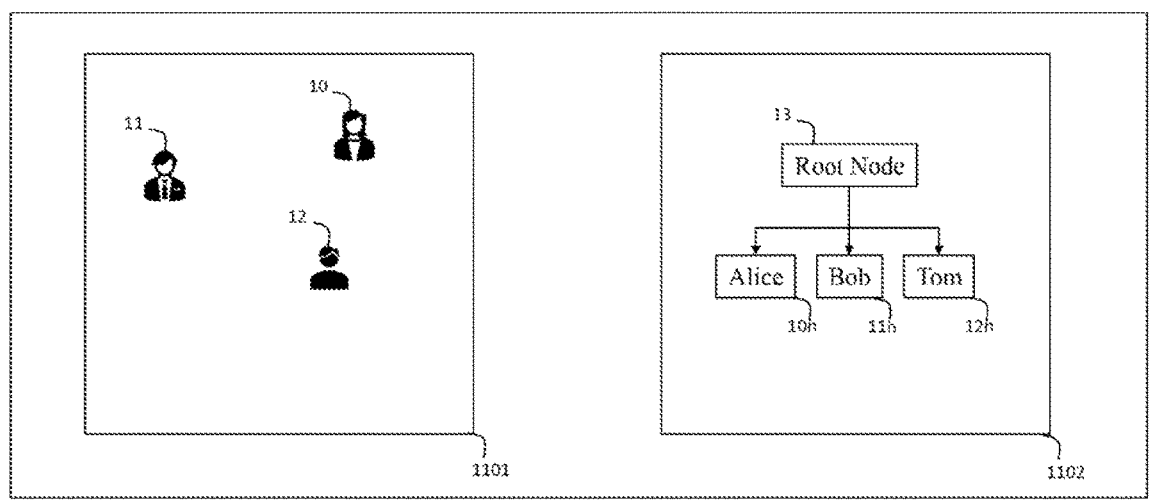
FIG. 11 is a simplified diagram in accordance with embodiments.

FIG. 10 shows an example 1000 in which user A 10, user B 11 and user T 12 are to participate in an AR conference physical space. As shown, user A 10 is in their office 1001, sitting in a conference physical space with various numbers of chairs, and user A 10 is taking on of the chairs. User B 11 is in their living physical space 1002, sitting on a love seat, there is also one or more couches for two people in his living physical space as well as other object such as a chair and table. User T 12 is at an airport lounge 1003, on a bench with a bench across a coffee table among one or more other coffee tables.

Figure 12:
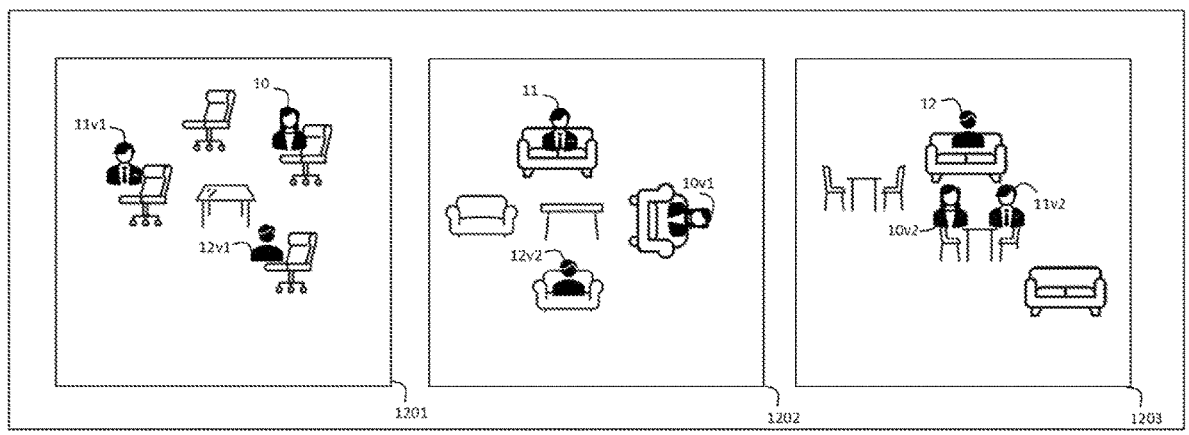
FIG. 12 is a simplified diagram in accordance with embodiments.
Figure 13:
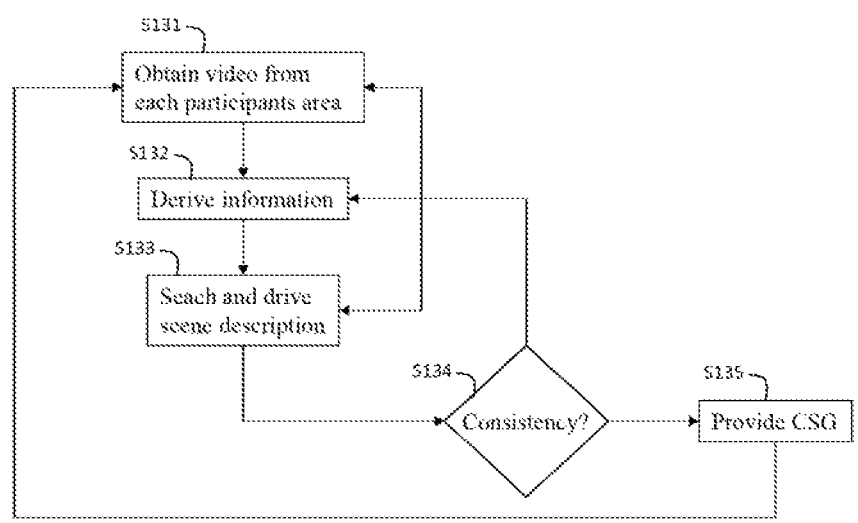
FIG. 13 is a simplified flowchart in accordance with embodiments.

As described with the example flowchart 1300 in FIG. 13, FIG. 12 shows an example 1200 in which the users A 10, B 11, and T12 share a virtual conference each in their own respective areas but with each other represented in a relative orientation that matches each other's perspectives, object's, and postures by each of their AR devices receiving information about each participant's location and overall layout such that the immersive media function produces a generic scene description that describes the relative positions. That generic scene description is illustrated as description 1101 in the example of FIG. 1100 and corresponds to the common scene graph (CSG) shown as CSG 1102 showing a root node 13 and nodes: node 10n for user A 10 (who could be named Alice for at least purposes of the graph), node 11n for user B 11 (who could be named Bob for at least purposes of the graph), and node 12n for user T 12 (who could be named Tom for at least purposes of the graph).

The CSG 1102 and description 1101 may be sent to all participating devices. The AR run time engine in each device customizes the scene graph based on the actual layout and location of chairs, tables, sofas, and benches. It decodes and renders the media object of each participant and overlays in the AR scene according to the customized scene graph.

FIG. 13 shows an example flowchart 1300 for an immersive media processing function (IMPF) that may be performed by each of the users' devices, such as each of user A 10, user B 11, and user T 12, and/or any other participants.

At S131, one or more pictures of what the person is seeing in their space: Alice's conference physical space and table, Bob's living physical space, and Tom's airport lounge; and depending on the users' respective capturing device(s), any of the following may be provided: one or more pictures or video, a depth map of the physical space, and a relative size of the physical space. Or at S132, such information may be derived in addition to the IMPF deriving the number of participants for the CSG. And at S133, for each received physical space, such as the office 1001, the living physical space 1002, and airport lounge 1003, the process searches each physical space location, using object detection, to identify one or more possible right locations for overlaying a participant and continues for finding each location for each participant. In this example 2 locations as two participants will be added to each of the respective ones of office 1001, the living physical space 1002, and airport lounge 1003, and drives a scene description accordingly which includes the participants' locations in the physical space.

At S134, there is a comparing of all derived physical space scene descriptions from which then there is derived a common scene description (CSG) in which the location of all participants in all corresponding physical spaces are same and semantically reasonable for that physical space; for example, see the example 1200 in FIG. 12 where in the office 1001, the AR of user A 10 shows to that user A 10 a virtual user B 11v1, corresponding to user B 11, and a virtual user T 12v1, corresponding to user T 12, and such that the virtual user B 11v1 and virtual user T 12v1 are shown to user A 10 as sitting on the object, office chairs, in the office 1001 as is the user A 10. And see in the living physical space 1202 in the example 1200 in which the AR for user B 11 shows the virtual user T 12v2, corresponding to the user T 12 but sitting on a couch in the living physical space 1202, and a virtual user A 10v1 corresponding to the user A 10 also sitting on object in the living physical space 1202 rather than the office chair in office 1201. See also in the airport lounge 1203 where the AR for the user T12 shows a virtual user A 10v2, corresponding to the user A 10 but sitting at a table at the airport lounge 1203, and a virtual user B 11v2 also sitting at the table across from virtual user A 10v2. And in each of those office 1201, living physical space 1202, and airport lounge 1203, the updated scene description of each physical space is consistent with other physical spaces in terms of position/seating arrangements. For example, user A 10 is shown as relatively counter-clockwise to user 11 or virtual representations thereof who is also relatively clockwise to user T 12 or virtual representations thereof per physical space. And at S135, if a satisfactory orientation and arrangement is reached at S134, then the derived common scene description (CSG) to all devices, otherwise, further information is obtained from one or more of S131, S132, ad S133 while the process checks for a satisfactory CSG to provide for all participating devices.

Each step of the example flowchart 1300 of FIG. 13 may be implemented by each participating device, such as 5G STAR US 600 in the example 500 in FIG. 5, or may be partly or mostly implemented by a cloud edge such as cloud/edge 801 with the example 800 in FIG. 8, or by one or more of the devices exemplified with respect to any of FIGS. 5 and 13.

The techniques described above, can be implemented as computer software using computer-readable instructions and physically stored in one or more computer-readable media or by a specifically configured one or more hardware processors. For example, FIG. 14 shows a computer system 1400 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
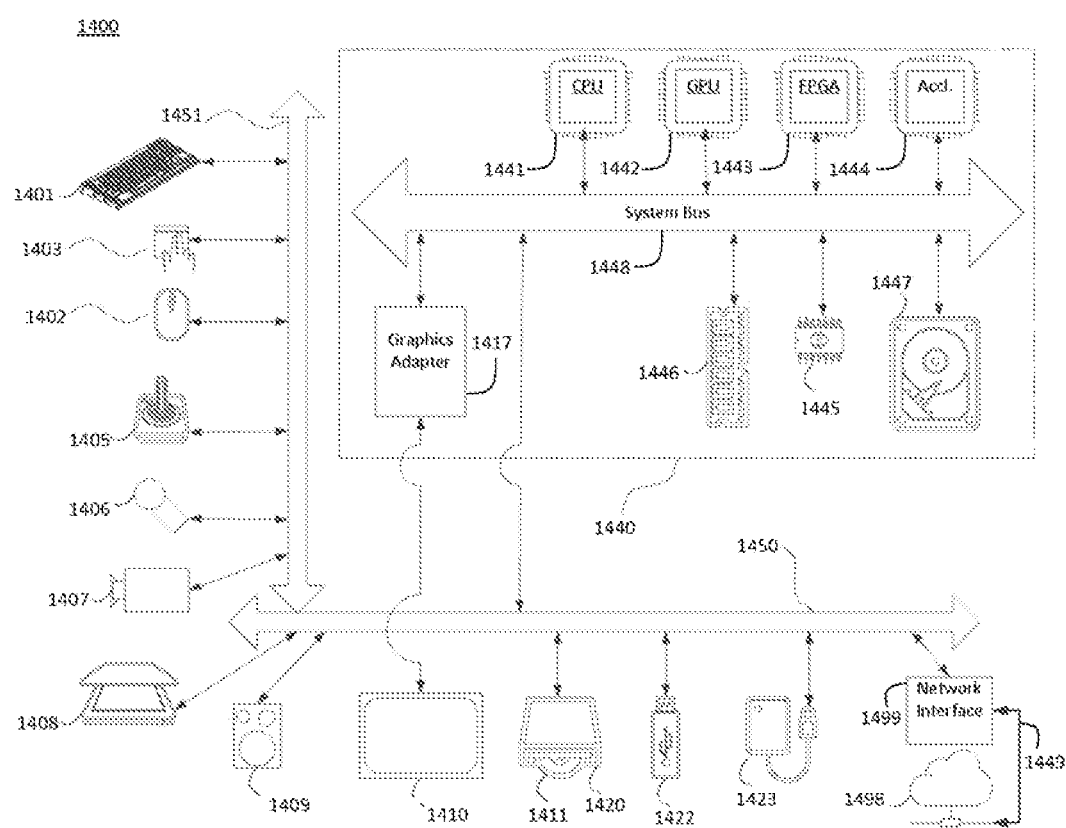
FIG. 14 is a schematic illustration in accordance with embodiments.

The components shown in FIG. 14 for computer system 1400 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1400.

Computer system 1400 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1401, mouse 1402, trackpad 1403, touch screen 1410, joystick 1405, microphone 1406, scanner 1408, camera 1407.

Computer system 1400 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1410, or joystick 1405, but there can also be tactile feedback devices that do not serve as input devices), audio output devices (such as: speakers 1409, headphones (not depicted)), visual output devices (such as screens 1410 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1400 can also include human accessible storage devices and their associated media such as optical media including CD/DVD ROM/RW 1420 with CD/DVD 1411 or the like media, thumb-drive 1422, removable hard drive or solid state drive 1423, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1400 can also include interface 1499 to one or more communication networks 1498. Networks 1498 can for example be wireless, wireline, optical. Networks 1498 can further be local, wide-area, metropolitan, vehicular and industrial, real-time, delay-tolerant, and so on. Examples of networks 1498 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1498 commonly require external network interface adapters that attached to certain general-purpose data ports or peripheral buses (1450 and 1451) (such as, for example USB ports of the computer system 1400; others are commonly integrated into the core of the computer system 1400 by attachment to a system bus as described below (for example Ethernet interface into a PC computer system or cellular network interface into a smartphone computer system). Using any of these networks 1498, computer system 1400 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1440 of the computer system 1400.

The core 1440 can include one or more Central Processing Units (CPU) 1441, Graphics Processing Units (GPU) 1442, a graphics adapter 1417, specialized programmable processing units in the form of Field Programmable Gate Areas (FPGA) 1443, hardware accelerators for certain tasks 1444, and so forth. These devices, along with Read-only memory (ROM) 1445, Random-access memory 1446, internal mass storage such as internal non-user accessible hard drives, SSDs, and the like 1447, may be connected through a system bus 1448. In some computer systems, the system bus 1448 can be accessible in the form of one or more physical plugs to enable extensions by additional CPUs, GPU, and the like. The peripheral devices can be attached either directly to the core's system bus 1448, or through a peripheral bus 1451. Architectures for a peripheral bus include PCI, USB, and the like.

CPUs 1441, GPUs 1442, FPGAs 1443, and accelerators 1444 can execute certain instructions that, in combination, can make up the aforementioned computer code. That computer code can be stored in ROM 1445 or RAM 1446. Transitional data can be also be stored in RAM 1446, whereas permanent data can be stored for example, in the internal mass storage 1447. Fast storage and retrieval to any of the memory devices can be enabled through the use of cache memory, that can be closely associated with one or more CPU 1441, GPU 1442, mass storage 1447, ROM 1445, RAM 1446, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1400, and specifically the core 1440 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1440 that are of non-transitory nature, such as core-internal mass storage 1447 or ROM 1445. The software implementing various embodiments of the present disclosure can be stored in such devices and executed by core 1440. A computer-readable medium can include one or more memory devices or chips, according to particular needs. The software can cause the core 1440 and specifically the processors therein (including CPU, GPU, FPGA, and the like) to execute particular processes or particular parts of particular processes described herein, including defining data structures stored in RAM 1446 and modifying such data structures according to the processes defined by the software. In addition or as an alternative, the computer system can provide functionality as a result of logic hardwired or otherwise embodied in a circuit (for example: accelerator 1444), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for augmented reality (AR) video streaming, the method comprising:
   obtaining video data from a first AR device and from a second AR device, the first AR device being worn by a first user in a first physical space, and the second AR device being worn by a second user in a second physical space separate from the first physical space;
   determining, based on the video data, a first orientation of the first user to any objects in the first physical space;
   determining, based on the video data, a second orientation of a second user to any objects on the second physical space;
   generating, from comparing different first and second physical space scene descriptions to each other and each being individually respective to ones of the first AR device and the second AR device, a common scene description for both the first AR device and the second AR device based on determining the first orientation and the second orientation, the common scene description indicates, by at least a common scene graph that is common to both of the first AR device and the second AR device, a seating arrangement of the first user and the second user consistently to both of the first AR device and the second AR device; and
   controlling, based on the common scene description, the first AR device to display, to the first user, a representation of the second user that is overlaid on an object in a virtual scene comprising the first physical space in which the first user is located.

2. The method according to claim 1,
wherein generating the common scene description is implemented by the first AR device.

3. The method according to claim 1,
wherein generating the common scene description is implemented by a network device separate from each of the first AR device and the second AR device.

4. The method according to claim 1,
wherein controlling the first AR device to display the second user virtually overlaid on the object in the first physical space is further based on checking whether to virtually overlay the second user on at least one other piece of object in the first physical space.

5. The method according to claim 1, further comprising:
   obtaining third video data from a third AR device, the third AR device being worn by a third user in a third physical space;
   determining, based on the third video data, a third orientation of the third user relative to any object in the third physical space; and
   generating the common scene description further based on determining the third orientation.

6. The method according to claim 5, further comprising controlling, based on the common scene description, the first AR device to display, to the first user, the third user such that the third user is virtually overlaid on a second object in the first physical space.

7. The method according to claim 6,
wherein an orientation of the second user virtually overlaid on the object and the third user overlaid on the second object is determined based on determining that the first user is to be virtually overlaid on other object in a corresponding orientation in each of the second physical space and the third physical space to relative perspectives of each of the second user and the third user.

8. The method according to claim 7,
wherein at least one of the first physical space, the second physical space, and the third physical space is a physical space in a home,
wherein others of the first physical space, the second physical space, and the third physical space are in any of an office and a public space.

9. The method according to claim 7,
wherein at least one of the first object and the second object is an office chair, and
wherein the third object is one of a love seat, a couch, and a coffee table.

10. The method according to claim 5,
wherein the common scene description is provided to each of the first AR device, the second AR device, and the third AR device.

11. An apparatus for augmented reality (AR) video streaming, the apparatus comprising:
   at least one memory configured to store computer program code;
   at least one processor configured to access the computer program code and operate as instructed by the computer program code, the computer program code including:
      obtaining code configured to cause the at least one processor to obtain video data from a first AR device and from a second AR device, the first AR device being worn by a first user in a first physical space, and the second AR device being worn by a second user in a second physical space separate from the first physical space;
      determining code configured to cause the at least one processor to determine, based on the video data, a first orientation of the first user to any object in the first physical space and a second orientation of a second user to any object on the second physical space;
      generating code configured to cause the at least one processor to generate, from comparing different first and second physical space scene descriptions to each other and each being individually respective to ones of the first AR device and the second AR device, a common scene description for both the first AR device and the second AR device based on determining the first orientation and the second orientation, the common scene description indicates, by at least a common scene graph that is common to both of the first AR device and the second AR device, a seating arrangement of the first user and the second user consistently to both of the first AR device and the second AR device; and controlling code configured to cause the at least one processor to control, based on the common scene description, the first AR device to display to the first user a representation of the second user that is overlaid on an object in a virtual scene comprising the first physical space in which the first user is located.

12. The apparatus according to claim 11, wherein generating the common scene description is implemented by the first AR device.

13. The apparatus according to claim 11, wherein generating the common scene description is implemented by a network device separate from each of the first AR device and the second AR device.

14. The apparatus according to claim 11, wherein controlling the first AR device to display the second user virtually overlaid on the object in the first physical space is further based on checking whether to virtually overlay the second user on at least one other piece of object in the first physical space.

15. The apparatus according to claim 11, the computer program code further comprising:
further obtaining code configured to cause the at least one processor to obtain third video data from a third AR device, the third AR device being worn by a third user in a third physical space;
further determining code configured to cause the at least one processor to determine, based on the third video data, a third orientation of the third user relative to any object in the third physical space; and
further generating code configured to cause the at least one processor to generate the common scene description further based on determining the third orientation.

16. The apparatus according to claim 15, the computer program code further comprising
further controlling code configured to cause the at least one processor to control, based on the common scene description, the first AR device to display, to the first user, the third user such that the third user is virtually overlaid on a second object in the first physical space.

17. The apparatus according to claim 16, wherein an orientation of the second user virtually overlaid on the object and the third user overlaid on the second object is determined based on determining that the first user is to be virtually overlaid on other object in a corresponding orientation in each of the second physical space and the third physical space to relative perspectives of each of the second user and the third user.

18. The apparatus according to claim 17, wherein at least one of the first physical space, the second physical space, and the third physical space is a physical space in a home,
wherein others of the first physical space, the second physical space, and the third physical space are in any of an office and a public space.

19. The apparatus according to claim 17, wherein at least one of the first object and the second object is an office chair, and
wherein the third object is one of a love seat, a couch, and a coffee table.

20. A non-transitory computer readable medium storing a program causing a computer to execute a process, the process comprising:
obtaining video data from a first AR device and from a second AR device, the first AR device being worn by a first user in a first physical space, and the second AR device being worn by a second user in a second physical space separate from the first physical space;
determining, based on the video data, a first orientation of the first user to any object in the first physical space;
determining, based on the video data, a second orientation of a second user to any object on the second physical space;
generating, from comparing different first and second physical space scene descriptions to each other and each being individually respective to ones of the first AR device and the second AR device, a common scene description for both the first AR device and the second AR device based on determining the first orientation and the second orientation, the common scene description indicates, by at least a common scene graph that is common to both of the first AR device and the second AR device, a seating arrangement of the first user and the second user consistently to both of the first AR device and the second AR device; and
controlling, based on the common scene description, the first AR device to display to the first user a representation of the second user that is virtually overlaid on an object in a virtual scene comprising the first physical space in which the first user is located.

* * * * *